Jan. 9, 1940.   J. S. WEEKS   2,186,055
BRAKE LEVER CONTROLLED SWITCH
Filed Nov. 5, 1936
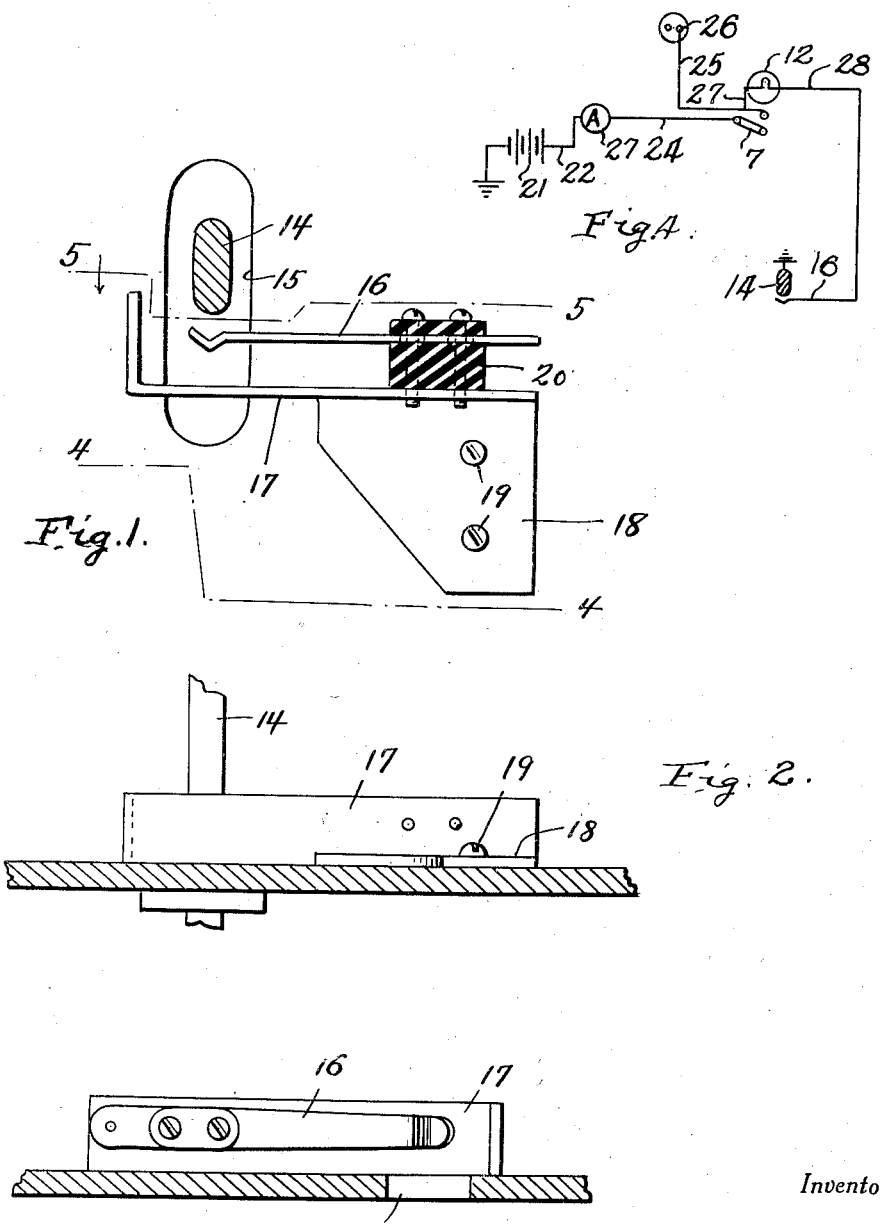
Inventor
Joseph S. Weeks
By Clarence A. O'Brien
Hyman Berman
Attorneys Patented Jan. 9, 1940

2,186,055

UNITED STATES PATENT OFFICE 2,186,055

BRAKE LEVER CONTROLLED SWITCH

Joseph S. Weeks, Indianapolis, Ind.; Rosa L. Weeks, administratrix of said Joseph S. Weeks, deceased Application November 5, 1936, Serial No. 109,370

1 Claim. (Cl. 200—59)

This invention appertains to new and useful improvements in a brake lever controlled switch for use in electrical signalling and more particularly to a warning device whereby the driver of an automobile can be warned that his brake is on when he cuts in the engine ignition of his automobile.

An important object of the present invention is to provide a signal light means whereby a warning light will be given when the ignition system of an automobile is closed and wherein the said warning light will become extinguished when the brake is released, thus preventing the driver from driving his car with the emergency brake applied.

Other important objects and advantages of the invention will become apparent to the reader of the following specification.

In the drawing:

Figure 1 is a top plan view of the switch showing the emergency brake lever in section.

Figure 2 is a sectional view taken substantially on the line 4—4 of Figure 1.

Figure 3 is a sectional view taken substantially on the line 5—5 of Figure 1.

Figure 4 is a diagrammatic view disclosing the electrical connections between the electrical devices involved.

As is customary, the brake lever 14 operates through the floor opening 15 and in the path of the lever 14 is the spring contact finger 16. Numeral 17 represents a guard for the contact finger 16 to prevent the same from being damaged by the driver's foot. This guard member 17 is of L-shape and extends from the plate 18 which is secured by screws 19 to the floor of the vehicle. A block 20 of insulation separates the contact finger 16 from the L-shaped guard plate 17.

Referring to Figure 4 it can be seen that numeral 21 represents the usual battery which has a connection 22 to the ammeter 23 and from the ammeter 23 the conductor 24 extends to the ignition switch 7. From the ignition switch 7 the jumper 25 extends to the usual ignition coil 26 while another jumper 27 connects to the socket of the lamp 12. The other side of the socket of the lamp 12 has a conductor 28 extending therefrom to connect to the contact finger 16. The brake lever 14 is grounded so that when the emergency brake is applied, the lever 14 is against the finger 16 so that current passes through the lamp 12 when the ignition switch 7 is closed. This is a red light warning to the driver besides illuminating the brake lever 14. As soon as the brake lever 14 is released it becomes removed from the contact finger 16, thus opening the lamp circuit so that the lamp 12 becomes extinguished.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

In a brake lever controlled switch, an attaching bracket having an angular flange along one edge, a contact member with which the brake lever contacts when in brake applied position, an insulated block securing the contact member adjacent one end in spaced parallel relation to said flange, said flange constituting a guard plate positioned behind the contact member and an angular extension on one end of the guard plate at right angles to and spaced from the free end of the contact member and constituting a shield for the free end of said contact member.

JOSEPH S. WEEKS.